(12) United States Patent
Swartz et al.

(10) Patent No.: US 8,092,315 B2
(45) Date of Patent: Jan. 10, 2012

(54) METHODS AND APPARATUS TO INDICATE IMPACT OF AN OBJECT

(75) Inventors: Greg J. Swartz, Anthem, AZ (US); Peter J. Kenville, Everett, WA (US); Laurence E. Tighe, Seattle, WA (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 394 days.

(21) Appl. No.: 11/735,316

(22) Filed: Apr. 13, 2007

(65) Prior Publication Data
US 2008/0254907 A1    Oct. 16, 2008

(51) Int. Cl.
*A63B 53/16*    (2006.01)
(52) U.S. Cl. ......... 473/237; 374/162; 116/207; 116/203
(58) Field of Classification Search .................. 473/237; 116/203, 206–207; 349/20, 21; 374/161–162
See application file for complete search history.

(56) References Cited

U.S. PATENT DOCUMENTS

| | | | |
|---|---|---|---|
| 2,660,436 A | 11/1953 | Grossman | |
| 3,754,764 A | 8/1973 | Manheck | |
| 5,033,746 A | 7/1991 | Jones | |
| 5,142,309 A | 8/1992 | Lee | |
| 5,202,677 A * | 4/1993 | Parker et al. | 349/21 |
| 5,350,634 A | 9/1994 | Sumii et al. | |
| 5,394,824 A | 3/1995 | Johnson | |
| 5,597,361 A | 1/1997 | Hope | |
| 5,698,296 A * | 12/1997 | Dotson et al. | 428/195.1 |
| 5,779,556 A | 7/1998 | Cervantes et al. | |
| 5,805,245 A | 9/1998 | Davis | |
| 6,008,269 A | 12/1999 | Kitagawa et al. | |
| 6,780,127 B2 * | 8/2004 | Kennedy, III | 473/378 |
| 6,941,818 B2 * | 9/2005 | Rakowski | 73/762 |
| 2002/0091011 A1 | 7/2002 | Sosin | |
| 2002/0167989 A1 * | 11/2002 | Russo | 374/141 |
| 2003/0052305 A1 * | 3/2003 | Coates et al. | 252/299.64 |
| 2005/0020387 A1 * | 1/2005 | Kennedy | 473/378 |
| 2005/0153790 A1 | 7/2005 | Lester | |
| 2007/0249435 A1 * | 10/2007 | Rodengen et al. | 473/490 |

FOREIGN PATENT DOCUMENTS

| | | |
|---|---|---|
| DE | 3904458 A1 | 2/1989 |
| JP | 8196666 A | 1/1995 |
| WO | WO 89/12214 A1 | 7/1988 |
| WO | WO 94/28982 A1 | 6/1994 |
| WO | WO 01/78851 A1 | 4/2001 |

* cited by examiner

*Primary Examiner* — Gene Kim
*Assistant Examiner* — Matthew B Stanczak (57) ABSTRACT

In one embodiment, an apparatus includes a substrate layer having a first and second sides, and at least one thermochromic compound layer to generate a set of temporary marks. The set of temporary marks is configured to include a first temporary mark at a first impact location associated with a first impact to a surface of a first object by a second object, and subsequent temporary marks at subsequent impact locations associated with subsequent impacts to the surface of the first object. The thermochromic compound layer can be in direct contact with the second object during the first impact, and is configured to enable the first temporary mark to fade throughout a fading period accommodative of the subsequent impacts, and to remain distinguishable throughout the fading period from the subsequent temporary marks. Other examples, embodiments and related methods are described and claimed herein.

26 Claims, 4 Drawing Sheets

METHODS AND APPARATUS TO INDICATE IMPACT OF AN OBJECT

TECHNICAL FIELD

The present disclosure relates generally to golf equipment, and more particularly, to methods and apparatus to indicate impact of an object.

BACKGROUND

In golf, the performance of an individual may be improved by inspecting and examining various aspects of the individual's golf swing. In particular, the club face of a golf club head may be inspected and examined after the swing to determine the point of impact on the club face by a golf ball. By hitting the golf ball at the optimal location on the club face, the individual may maximize accuracy and distance of the golf ball. Dirt particles, grass stains, and/or an impression of a golf ball on a club face may indicate the point of impact on the club face by the golf ball. Alternatively, an impact indicator affixed to the club face may also be used to determine the point of impact on the club face by the golf ball.

DESCRIPTION

In general, methods, apparatus, and articles of manufacture to indicate impact by an object are described herein. The methods, apparatus, and articles of manufacture described herein are not limited in this regard.

In the example of FIGS. 1-4, an impact indicator 100 may include an impact surface 110. In particular, the impact surface 110 may generate one or more temporary marks in response to impact by one or more objects to the impact indicator 100 (e.g., an impression of a golf ball). Each temporary mark may be associated with an area of impact on the impact surface 110 by an object.

The impact indicator 100 may be used in a variety of ways such as for golf fitting, instructional, educational, and/or other suitable purposes. In one example, the impact indicator 100 may be affixed to a club head of a golf club (e.g., a driver-type club, a fairway wood-type club, an iron-type club, a hybrid-type club, a putter, etc.). In particular, the impact indicator 100 may be disposed on a portion of the club face (not shown) of the club head (e.g., a dimension of 2.9 inches×1.4 inches (73.66 mm×35.56 mm)). Alternatively, the impact indicator 100 may cover the entire surface area of the club face. In response to impact by an object, the impact surface 110 may generate one or more temporary marks, generally shown as 210, 310, 410, 420, 430, 440, and 450 of FIGS. 2, 3, and 4, respectively. As described in detail below, each temporary mark on the impact surface 110 may be associated with an area of impact on the club face by a golf ball and depict a portion of the golf ball (e.g., an impression of one or more dimples).

Figure 1:
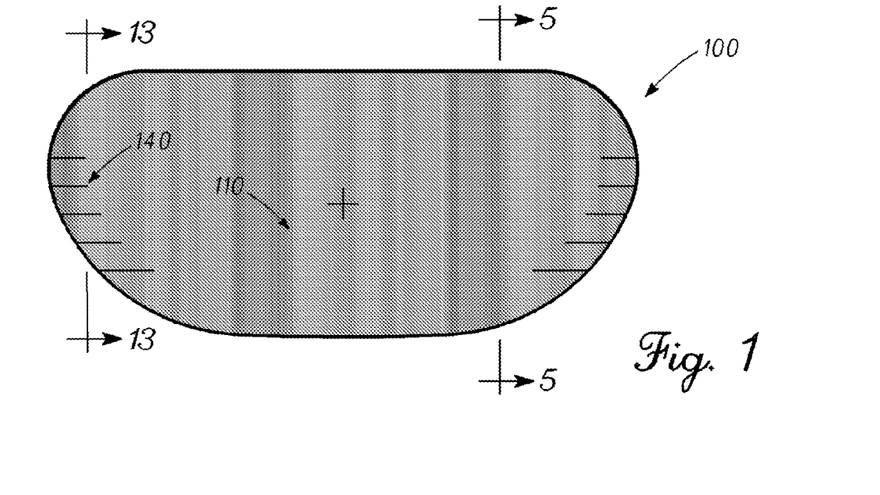
FIG. 1 is a perspective diagram representation of an example impact indicator according to an embodiment of the methods, apparatus, and articles of manufacture described herein.

In one example, a life cycle associated with the impact indicator 100 may be described in connection with time $t_0$, $t_1$, $t_2$, and $t_3$ (i.e., $t_0 < t_1 < t_2 < t_3$) and depicted by FIGS. 1, 2, 3, and 4, respectively. Initially at time to, the impact indicator 100 may be affixed to a club face and ready for use as illustrated in FIG. 1 (e.g., no temporary marks on the impact surface 110). For example, the impact surface 110 may be associated with a grayish color.

Figure 2:
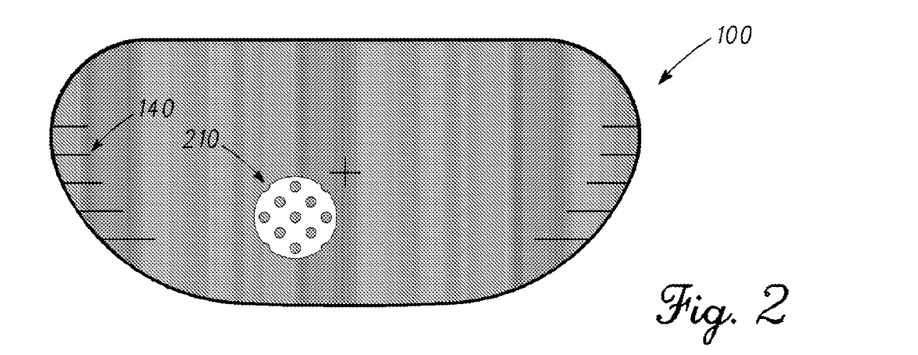
FIG. 2 depicts another perspective diagram representation of the example impact indicator of FIG. 1.

In response to an initial impact by a golf ball at time $t_1$, the impact indicator 100 (e.g., via the impact surface 110) may generate a temporary mark 210 as depicted in FIG. 2. In one example, the temporary mark 210 may be associated with a whitish color. As noted above, the temporary mark 210 on the impact surface 110 may be associated with an area of impact on the club face by the golf ball. For example, the temporary mark 210 may depict a portion of the golf ball (e.g., an impression of one or more dimples).

Figure 3:
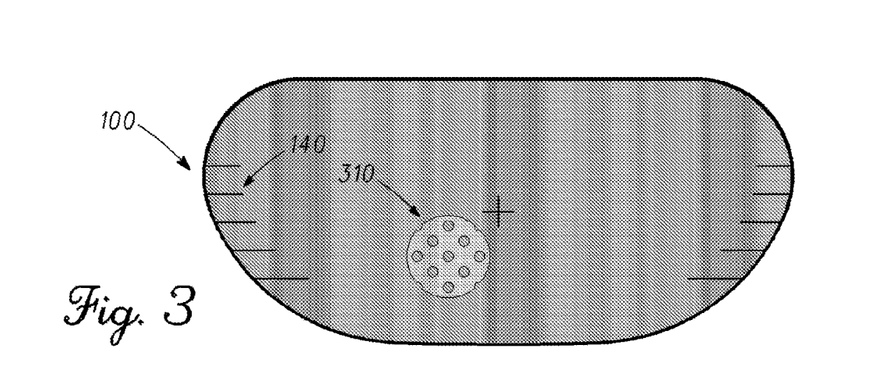
FIG. 3 depicts another perspective diagram representation of the example impact indicator of FIG. 1.

The temporary mark 210 of FIG. 2 may begin to fade after time $t_1$ and become the temporary mark 310 of FIG. 3 by time $t_2$. The temporary mark 310 of FIG. 3 may begin to fade after time $t_2$ and become the temporary mark 410 of FIG. 4 by time $t_3$. Accordingly, the temporary mark 410 of FIG. 4 at time $t_3$ may be more faded than the temporary mark 310 of FIG. 3 at time $t_2$ and the temporary mark 210 of FIG. 2 at time $t_1$.

With the temporary mark 410 being substantially faded by time $t_3$, the impact indicator 100 may be reused to indicate subsequent impacts by golf balls. For example, the impact indicator 100 may generate other temporary marks, generally shown as 420, 430, 440, and 450 in FIG. 4, with each temporary mark may correspond to an impact by a golf ball after the initial impact by a golf ball at time $t_1$. The impact indicator 100 may generate the temporary marks 420, 430, 440, and 450 after time $t_2$ and before time $t_3$.

Figures 4, 5, 6, 7:
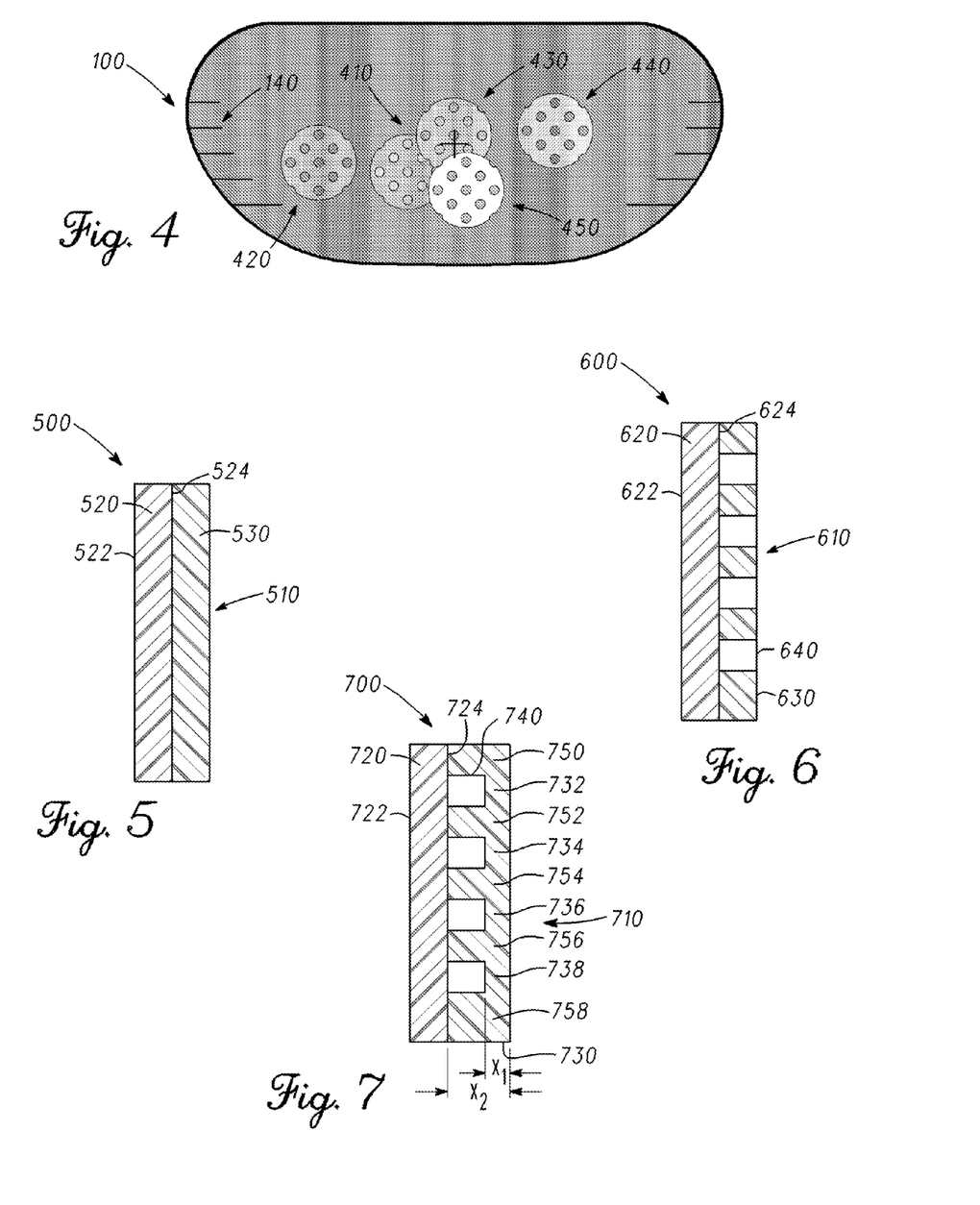
FIG. 4 depicts another perspective diagram representation of the example impact indicator of FIG. 1.
FIG. 5 depicts a cross-section side view of an example impact indicator.
FIG. 6 depicts a cross-section side view of another example impact indicator.
FIG. 7 depicts a cross section side view of another example impact indicator.

Each temporary mark 410, 420, 430, 440, and 450 may be distinct from each other. Although two or more impacts by an object may occur within a substantially proximate area of the impact surface 110, the corresponding temporary marks may be distinguishable from each other. In particular, a relatively less-faded mark may indicate a relatively more-recent impact by a golf ball on the impact surface 110. In one example, the temporary mark 450 may be more recent than the other temporary marks 410, 420, 430, and 440 because the temporary mark 450 may be relatively less faded than the other temporary marks 410, 420, 430, and 440.

In addition the impact surface 110, the impact indicator 100 may include one or more graphical representations, generally shown as 140. For example, the graphical representation(s) 140 may be an alignment mark, a logo, a phrase, a trademark, and/or other suitable marks. In particular, alignment marks may be used to align the impact indicator 100 to a plurality of grooves on a club face of a golf club head. The graphical representation(s) 140 may be located in various areas of the impact indicator 100 (e.g., sides, top, bottom, center, upper-right corner, lower-right corner, upper-left corner, and/or lower-left corner of the impact indicator 100). In one example, the alignment marks may be located on left and/or right sides of the impact indicator 100.

While FIGS. 1-4 may depict the impact surface 110 being associated with a grayish color, the impact surface 110 may be associated with other suitable color (e.g., black, blue, green, red, orange, yellow, brown, etc.) and/or any combination thereof. Although the above examples may be described with respect to a club face of a golf club head, the impact indicator 100 may be affixed to other portions of a golf club. In one example, the impact indicator 100 may be affixed to the sole of the golf club head so that each temporary mark on the impact surface 110 may correspond to an area of impact on the sole by the ground. Further, while the above examples may be described with respect to golf, the methods, apparatus, and articles of manufacture described herein may be applicable to other sports. For example, the impact indicator 100 may be affixed to a hockey stick, a baseball bat, a tennis racket, a target, etc. The methods, apparatus, and articles of manufacture described herein are not limited in this regard.

026 Referring to FIG. 5, for example, an impact indicator 500 may include a substrate layer 520 and a thermochromic compound layer 530. The substrate layer 520 may be made of a durable material to withstand multiple impacts by an object (e.g., golf balls). Thus, the impact indicator 500 may be used for more than one fitting or practice sessions. For example, the substrate layer 520 may be a filmic-type material such as a polyester-type material and/or other suitable type of materials. Further, the substrate layer 520 may be a variety of colors (e.g., white, black, blue, green, red, orange, yellow, brown, etc. and/or any combination thereof). The substrate layer 520 may include a first side 522 and a second side 524. As described in detail below, the first side 522 may engage a surface. In one example, the first side 522 of the substrate layer 520 may engage a club face (not shown) of a golf club head.

The thermochromic compound layer 530 may overlay the second side 524 of the substrate layer 520. In particular, the thermochromic compound layer 530 may overlay a portion or the entire surface area of the second side 524 of the substrate layer 520. The thermochromic compound layer 530 may generate one or more temporary marks in response to impact by an object. The thermochromic compound layer 530 may be in direct contact with the object during impact by the object on the impact indicator 500. As a result, the thermochromic compound layer 530 may operate as an impact surface 510 of the impact indicator 500.

The thermochromic compound layer 530 may be a reusable, temperature-sensitive layer. In general, the thermochromic compound layer 530 may encapsulate a donor and an acceptor together to form a first color. For example, the thermochromic compound layer 530 may be associated with a grayish color (e.g., as shown in FIG. 1) at a reference temperature such as ambient temperature (e.g., a reference state). The thermochromic compound layer 530 may include an electron donor, an electron acceptor, and a desensitizer. In particular, the donor, the acceptor, and the desensitizer may be encapsulated together within a single capsule medium. In one example, at or less than the reference temperature (e.g., less than or equal to the ambient temperature), the desensitizer may be in a solid state, and the combination of the donor and the acceptor may form a colored dye (e.g., a grayish color). At a temperature higher than the reference temperature (e.g., greater than the ambient temperature), the desensitizer may melt and dissolve the colored dye into separate, colorless donor and acceptor (e.g., transparent).

As noted above, the impact indicator 500 may change color (e.g., one or more portions of the thermochromic compound layer 530 may become transparent) as the donor and the acceptor of the thermochromic compound layer 530 dissolve within the single capsule medium when temperature increases. A portion of the energy associated with an impact by a golf ball to the club face may generate a temporary mark on the impact surface 510 (e.g., a white or whitish color mark as shown in FIG. 2). Temporary marks on the impact indicator 500 may vary based on the color of the substrate layer 520. In one example, a temporary mark may be a white or whitish color mark if the substrate layer 520 is associated with a white or whitish color because one or more portions of the thermochromic compound layer 530 become transparent.

In contrast to other impact sensitive recording media with dye capsules that rupture and generate permanent marks (e.g., separately encapsulated donors and acceptors), the electron donor and the electron acceptor of the thermochromic compound layer 530 are pre-combined to form the colored dye. In response to an increase in temperature, the desensitizer of the thermochromic compound layer 530 may separate the donor and the acceptor from each other so that the donor and the acceptor are colorless (e.g., one or more portions of the thermochromic compound layer 530 may become transparent). The donor and the acceptor of the thermochromic compound layer 530 may re-combine to form the colored dye as the temperature of the impact surface 510 decreases and returns substantially to the reference temperature (e.g., the temporary marks 310 and 410 as shown in FIG. 3 and FIG. 4, respectively). As a result, the impact indicator 500 may be reusable after the thermochromic compound layer 530 returns substantially to the reference state. The methods, apparatus, and articles of manufacture described herein are not limited in this regard.

As mentioned above and illustrated in FIG. 1, the impact indicator 100 may include one or more graphical representations 140 such as an alignment mark, a logo, a phrase, a trademark, and/or other suitable marks. Turning to FIG. 6, for example, an impact indicator 600 may include a substrate layer 620, a first thermochromic compound layer 630, and a second thermochromic compound layer 640. The substrate layer 620 may include a first side 622 and a second side 624. The first thermochromic compound layer 630 may be associated with a first color (e.g., a grayish color) and the second thermochromic compound layer 640 may be associated with a second color (e.g., a blue color). Alternatively, the first and second thermochromic compound layers 630 and 640 may be associated with the same color (e.g., black) but vary in contrast so that the first and second thermochromic compound layers 630 and 640 may be distinguishable from each other. The first and second thermochromic compound layers 630 and 640 may overlay a portion or the entire surface area of a second side 624. In particular, the first thermochromic compound layer 630 may overlay the second side 624 of the substrate layer 620 so that the first thermochromic compound layer 630 may be in direct contact with a golf ball when the golf ball impacts the club face of the golf club head. As a result, the first thermochromic compound layer 630 may operate as an impact surface 610 of the impact indicator 600.

The second thermochromic compound layer 640 may be associated with one or more graphical representations such as a logo, a word, a phrase, a trademark, an alignment mark, and/or other suitable marks. The second thermochromic compound layer 640 may overlay the second side 624 of the substrate layer 620 so that the graphical representations may be visible. In one example, the first and second thermochromic compound layer 630 and 640 may be adjacent to each other. In particular, the first and second thermochromic compound layers 630 and 640 may be disposed on one or more portions of the second side 624 of the substrate layer 620 but not on each other. As a result, both the first and second thermochromic compound layers 630 and 640 may be in direct contact with a golf ball when the golf ball impacts the club face of the golf club head. As a result, the first and second thermochromic compound layers 630 and 640 may operate as an impact surface 610 of the impact indicator 600. The methods, apparatus, and articles of manufacture described herein are not limited in this regard.

In the example of FIG. 7, an impact indicator 700 may include a substrate layer 720, a first thermochromic compound layer 730, and a second thermochromic compound layer 740. The substrate layer 720 may include a first side 722 and a second side 724. The first and second thermochromic compound layers 730 and 740 may be disposed on one or more portions of the second side 724 of the substrate layer 720. Further, the first thermochromic compound layer 730 may be disposed on the second thermochromic compound layer 740.

The first thermochromic compound layer 730 may include a plurality of first portions with each first portion having a first thickness ($x_1$), generally shown as 732, 734, 736, and 738. The first thermochromic compound layer 730 may also include plurality of second portions with each second portion having a second thickness ($x_2$), generally shown as 750, 752, 754, 756, and 758. The plurality of first portions 732, 734, 736, and 738 may be disposed on the second thermochromic compound layer 740. The plurality of second portions 750, 752, 754, 756, and 758 may be disposed on the second side 724 of the substrate layer 720. Accordingly, the second thermochromic compound layer 740 may be associated with a thickness of $x_2 - x_1$. For example, the first thickness ($x_1$) may be relatively thinner than the second thickness ($x_2$) so that and the one or more graphical representations associated with the second thermochromic compound layer 740 may or may not be visible. The first thermochromic compound layer 730 may be in direct contact with a golf ball when the golf ball impacts the club face of the golf club head. As a result, the first thermochromic compound layer 730 may operate as an impact surface 710 of the impact indicator 700. The methods, apparatus, and articles of manufacture described herein are not limited in this regard.

Figure 8:
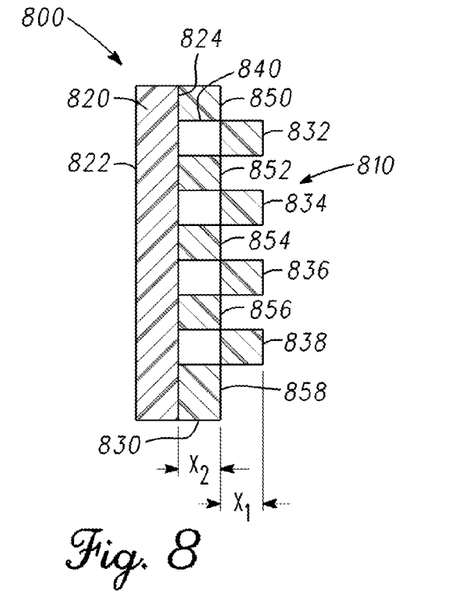
FIG. 8 depicts a cross-section side view of another example impact indicator.

Referring to FIG. 8, for example, an impact indicator 800 may include a substrate layer 820, a first thermochromic compound layer 830, and a second thermochromic compound layer 840. The substrate layer 820 may include a first side 822 and a second side 824. The first and second thermochromic compound layers 830 and 840 may be disposed on one or more portions of the second side 824 of the substrate layer 820. In particular, the first thermochromic compound layer 830 may include a plurality of first portions with each first portion having a first thickness ($x_1$), generally shown as 832, 834, 836, and 838. The first thermochromic compound layer 830 may also include a plurality of second portions with each second portion having a second thickness ($x_2$), generally shown as 850, 852, 854, 856, and 858. The plurality of first portions 832, 834, 836, and 838 may be disposed directly on the second thermochromic compound layer 840. The plurality of second portions 850, 852, 854, 856, and 858 may be disposed on the second side 824 of the substrate 820.

In contrast to the impact indicator 700 of FIG. 7, the first thermochromic compound layer 830 may be disposed on the second thermochromic compound layer 840 and one or more portions of the second side 824 of the substrate layer 820 in a uniform manner. Accordingly, the first thickness ($x_1$) may be equal to or substantially equal to the second thickness ($x_2$). The first thermochromic compound layer 830 may be in direct contact with a golf ball when the golf ball impacts the club face of the golf club head. As a result, the first thermochromic compound layer 830 (e.g., portions 832, 834, 836, 838, 850, 852, 854, 856, and 858) may operate as an impact surface 810 of the impact indicator 800. The methods, apparatus, and articles of manufacture described herein are not limited in this regard.

Figure 9:
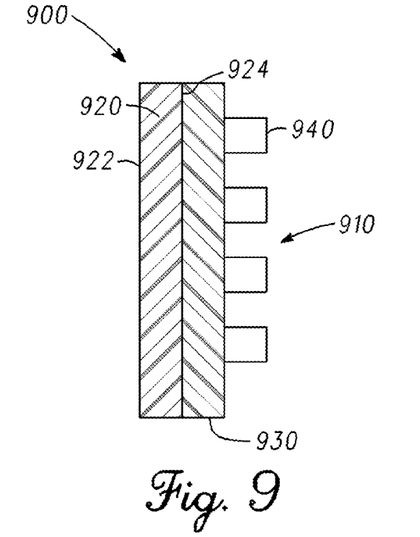
FIG. 9 depicts a cross-section side view of another example impact indicator.

As illustrated in FIG. 9, for example, an impact indicator 900 may include a substrate layer 920, a first thermochromic compound layer 930, and a second thermochromic compound layer 940. The substrate layer 920 may include a first side 922 and a second side 924. The first thermochromic compound layer 930 may be disposed on one or more portions of the second side 924 of the substrate layer 920. The second thermochromic compound layer 940 may be disposed on one or more portions of the first thermochromic compound layer 930 so that the one or more graphic representations associated with the second thermochromic compound layer 940 may be visible. Further, one or more portions of each of the first and second thermochromic compound layers 930 and 940 may be in direct contact with a golf ball when the golf ball impacts the club face of the golf club head. Thus, the first and second thermochromic compound layers 930 and 940 may operate as an impact surface 910 of the impact indicator 900. The methods, apparatus, and articles of manufacture described herein are not limited in this regard.

Although the above examples are described with respect to thermochromic compound layers (e.g., 630, 640, 730, 740, 830, 840, 930, and 940 of FIGS. 6, 7, 8, and 9, respectively), either of the of the first or second thermochromic compound layers 630, 640, 730, 740, 830, 840, 930, and 940 may be replaced by a non-thermochromic compound layer to provide one or more graphical representations (e.g., an alignment mark, a logo, a phrase, a trademark, etc.). While FIGS. 5, 6, 7, 8, and 9 may illustrate particular size and thickness for each layer, the layers associated with the impact indicators 500, 600, 700, 800, and 900 may vary in size and thickness. The methods, apparatus, and articles of manufacture described herein are not limited in this regard.

As noted above, the impact indicator 100 may engage a surface (e.g., a club face of a golf club head) in various manners. For example, the impact indicator 100 may be affixed to a club face with tape and/or other suitable adhesive materials. In the example, of FIG. 10, the impact indicator 1000 may include a substrate layer 1020, a thermochromic compound layer 1030, and an adhesive layer 1060. The substrate layer 1020 may include a first side 1022 and a second side 1024. In one example, the thermochromic compound layer 1030 may be disposed on one or more portions of the second side 1024 of the substrate layer 1020. In another example, the thermochromic compound layer 1030 may cover the entire surface area of the second side 1024 of the substrate layer 1020.

Figure 10:
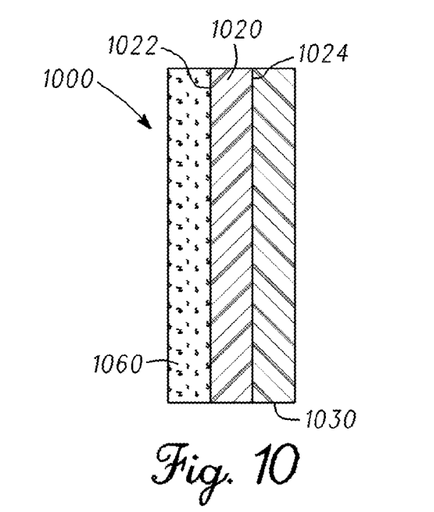
FIG. 10 depicts a cross-section side view of another example impact indicator.

The adhesive layer 1060 may be disposed on one or more portions of the first side 1022 of the substrate layer 1020. Alternatively, the adhesive layer 1060 may cover the entire surface area of the first side 1022. The adhesive layer 1060 may include pressure-sensitive adhesive to affix the impact indicator 1000 to a club face (not shown). The impact indicator 1000 may be releasable so that the impact indicator 1000 may be peeled off of the club face and affixed to another club face. Further, the impact indicator 1000 may be repositionable so that the impact indicator 1000 may be adjusted in various directions (e.g., up, down, left, right, etc.) on the club face. The methods, apparatus, and articles of manufacture described herein are not limited in this regard.

Figure 11:
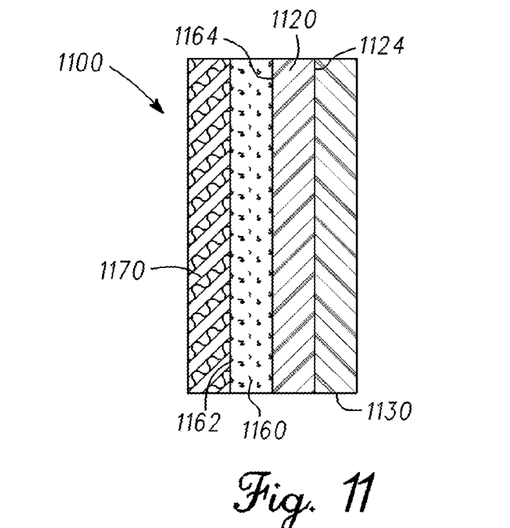
FIG. 11 depicts a cross-section side view of another example impact indicator.

To protect an adhesive layer of the impact indicator 100 (e.g., the adhesive layer 1060 of FIG. 10) prior to use, the impact indicator 100 may include a release liner. Referring to FIG. 11, for example, the impact indicator 1100 may include a substrate layer 1120, a thermochromic compound layer 1130, an adhesive layer 1160, and a liner layer 1170. The substrate layer 1120 may include a first side 1122 and a second side 1124. The thermochromic compound layer 1130 may be disposed on one or more portions of the second side 1124 of the substrate layer 1120.

The adhesive layer 1160 may include a first side 1162 and a second side 1164. The adhesive layer 1160 (e.g., via the second side 1164) may be disposed directly on one or more portions of the first side 1122 of the substrate layer 1120. The liner layer 1170 (or backing material) may be disposed on one or more portions of the first side 1162 of the adhesive layer 1160. For example, the liner layer 1170 may be a silicone-coated paper and/or any other suitable materials. The liner layer 1170 may prevent the impact indicator 1100 from adhering to unintended surfaces. Accordingly, the liner layer 1170 may cover and/or protect the adhesive layer 1160 until the impact indicator 1100 is used. The methods, apparatus, and articles of manufacture described herein are not limited in this regard.

Figure 12:
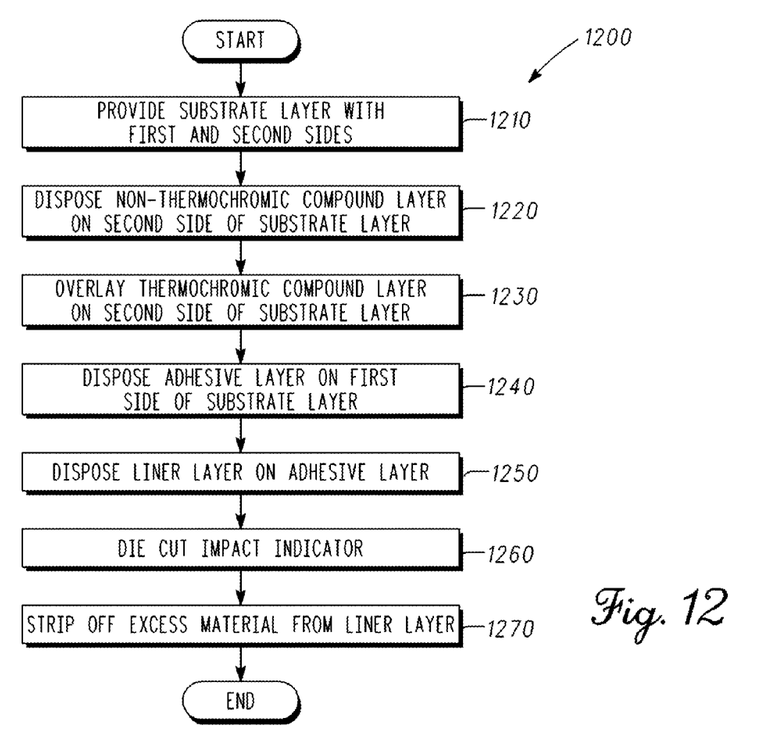
FIG. 12 is a flow diagram representation of one manner in which an example impact indicator of FIG. 13 may be manufactured.

FIG. 12 depicts one manner in which an impact indicator 1300 (FIG. 13) may be manufactured. In the example of FIG. 12, the process 1200 may begin with providing a substrate layer 1320 with a first side 1322 and a second side 1324 (block 1210). The process 1200 may dispose a non-thermochromic compound layer 1340 on the second side 1324 of the substrate layer 1320 (block 1220). In particular, the non-thermochromic compound layer 1340 may be associated with one or more graphical representations such as an alignment mark, a logo, a word, a phrase, a trademark, and/or other suitable marks.

Figure 13:
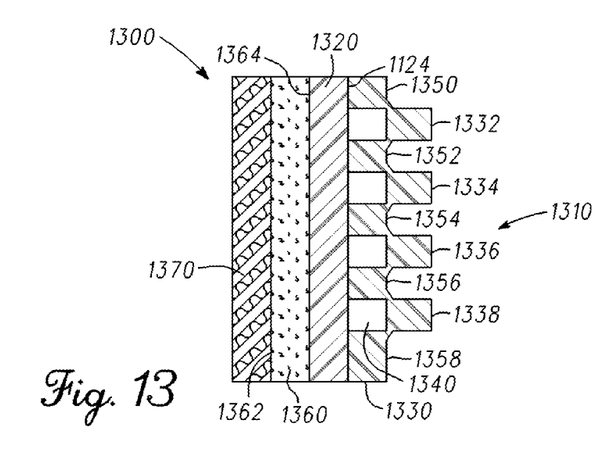
FIG. 13 depicts a cross-section side view of another example impact indicator.

The process 1200 may continue with overlaying a thermochromic compound layer 1330 on the second side 1324 of the substrate layer 1320 (block 1230). In particular, the thermochromic compound layer 1330 may be applied to the second side 1324 of the substrate layer 1320 in a uniform manner. For example, the thermochromic compound layer 1330 may be printed on the second side 1324 of the substrate layer 1320. The thermochromic compound layer 1330 may be disposed on one or more portions of the second side 1324, generally shown as 1350, 1352, 1354, 1356, and 1358. With the non-thermochromic compound layer 1340 disposed on one or more portions of the second side 1324, the thermochromic compound layer 1330 may be disposed on one or more portions of the non-thermochromic compound layer 1340, generally shown as 1332, 1334, 1336, and 1338. The thickness of the portions 1350, 1352, 1354, 1356, and 1358 may be equal to or substantially equal to the thickness of the portions 1332, 1334, 1336, and 1338. The thermochromic compound layer 1330 may be in direct contact with a golf ball when the golf ball impacts a club face (not shown) of a golf club head associated with the impact indicator 1300. Thus, the thermochromic compound layer 1330 may operate as an impact surface 1310 of the impact indicator 1300.

To affix the impact indicator 1300 to a club face of a golf club head or other suitable surfaces, the impact indicator 1300 may include an adhesive layer 1360 with a first side 1362 and a second side 1364. Accordingly, the process 1200 may dispose the adhesive layer 1360 (e.g., via the second side 1364) to the first side 1322 of the substrate layer 1320 (block 1240). In one example, the adhesive layer 1360 may be a pressure-sensitive adhesive or other suitable adhesive.

To cover and protect the adhesive layer 1360 from adhering to unintended surfaces, the process 1200 may include a liner layer 1370. In particular, the process 1200 may dispose the liner layer 1370 on the first side 1362 of the adhesive layer 1360 (block 1250).

Further, the process 1200 may die cut the impact indicator 1300 to form a particular shape (block 1260). In one example, the process 1200 may die cut the impact indicator 1300 into a shape corresponding to a club face of a golf club head (e.g., the shape of the impact indicator 100 of FIG. 1). Based on the shape of the impact indicator 1300, the process 1200 may strip off any excess material from the liner layer 1370 (block 1270). In particular, the voids in the excess material associated with the liner layer 1370 may form the shape of the impact indicator 1300 (e.g., the excess material may form the reverse or negative of the shape of the impact indicator 1300). The methods, apparatus, and articles of manufacture described herein are not limited in this regard.

The example process 1200 of FIG. 12 is merely provided and described in conjunction with the impact indicator 1300 of FIG. 13 as an example of one way to manufacture an impact indicator. Although the process 1200 may be described above with a non-thermochromic compound layer, the process 1200 may dispose a thermochromic compound layer associated with the graphical representation(s) on the second side 1324 of the substrate layer 1320 instead of the non-thermochromic compound layer 1340. As a result, the impact indicator 1300 may include two thermochromic compound layers. While the process 1200 may be described above with respect to a club face of a golf club head, the process 1200 may be applicable other suitable sport equipment or surface. Further, Although FIG. 12 depicts a particular number of blocks, the process 1200 may not perform one or more blocks. In one example, the impact indicator 1300 may be affixed to a surface with tape or glued to the surface. As a result, blocks 1240 and 1250 of the process 1200 may not be necessary. In another example, blocks 1260 and 1270 of the process 1200 may not be necessary. In addition, while a particular order of actions is illustrated in FIG. 12, these actions may be performed in other temporal sequences. For example, two or more actions depicted in FIG. 12 may be performed sequentially, concurrently, or simultaneously. In one example, blocks 1260 and 1270 may be performed simultaneously or concurrently. The methods, apparatus, and articles of manufacture are not limited in this regard.

Although the above examples may be described with respect to a golf club face, the methods, apparatus, and articles of manufacture described herein may be applicable to other suitable sport equipments or surfaces. For example, the impact indicator 100 may be affixed to a sole of a golf club head, a portion of a hockey stick, a portion of a baseball bat, a portion of a racket, etc.

Although certain example methods, apparatus, and/or articles of manufacture have been described herein, the scope of coverage of this disclosure is not limited thereto. On the contrary, this disclosure covers all methods, apparatus, and/or articles of manufacture fairly falling within the scope of the appended claims either literally or under the doctrine of equivalents.

What is claimed is:

1. An apparatus comprising:
   a substrate layer having a first side and a second side, the first side to engage a surface of a first object; and
   at least one thermochromic compound layer overlaying at least first and second surface portions of the second side of the substrate layer to generate a set of temporary marks;
   wherein:
   the at least one thermochromic compound comprises a layer comprising:
   a first thermochromic compound; and
   a second thermochromic compound different than the first thermochromic compound,
   the first thermochromic compound overlays the first surface portion without overlaying the second surface portion;
   the second thermochromic compound overlays the second surface portion without overlaying the first surface portion;
   the second thermochromic compound is disposed proximate to and in direct contact with at least part of the first thermochromic compound;
   the first thermochromic compound comprises a first thermochromic color at a first temperature;
   the second thermochromic compound comprises a second thermochromic color at a first temperature;
   while the first and second thermochromic compounds are at the first temperature, a contrast between the first and second thermochromic colors defines a pattern over the substrate layer;
   the set of temporary marks is configured to comprise:
   a first temporary mark at a first impact location associated with a first impact over the surface of the first object by a second object; and
   one or more subsequent temporary marks at one or more subsequent impact locations associated with one or more subsequent impacts to the surface of the first object;
   the at least one thermochromic compound is configured to be in direct contact with the second object during at least the first impact such that at least one of the first or second thermochromic compounds directly contacts the second object;
   the thermochromic compound is configured to enable the first temporary mark to:
   fade throughout a fading period accommodative of the one or more subsequent impacts; and
   remain distinguishable throughout the fading period from the one or more subsequent temporary marks;
   the apparatus is reusable after the one or more subsequent impacts to indicate further impacts via further temporary marks after the first temporary mark and the one or more subsequent temporary marks have completely faded away; and
   the apparatus is devoid of a protective barrier between the thermochromic compound and the second object during the first impact.

2. An apparatus as defined in claim 1 further comprising a non-thermochromic compound layer overlaying the second side of the substrate layer to form at least one graphical representation associated with at least one of a logo, a word, a phrase, a trademark, or an alignment mark;
   wherein a portion of the non-thermochromic compound is interspersed with a portion of the at least one thermochromic compound over the second side of the substrate layer.

3. An apparatus as defined in claim 2, wherein:
   the at least one graphical representation remains visible through the temporary mark.

4. An apparatus as defined in claim 1 further comprising:
   a releasable adhesive layer disposed on the first side of the substrate layer; and
   a silicone-coated liner layer configured to be separable from the adhesive layer.

5. An apparatus as defined in claim 1, wherein the substrate layer comprises a polyester-type material.

6. An apparatus as defined in claim 1 further comprising at least one graphical representation to correspond with at least one of a plurality of grooves associated with a golf club head.

7. An apparatus as defined in claim 1, wherein the surface comprises at least one of a club face of a golf club head, a sole of a golf club head, a portion of a hockey stick, or a portion of a baseball bat.

8. An apparatus as defined in claim 1, wherein:
   while the first and second thermochromic compounds are at a second temperature, the set of temporary marks are transparent through at least a portion of the at least one thermochromic compound.

9. An apparatus as defined in claim 1, wherein:
   each of the at least one thermochromic compound comprises:
   one or more donor particles, and one or more acceptor particles;
   the one or more donor particles and the one or more acceptor particles form a first color when combined together;
   the one or more donor particles and the one or more acceptor particles are transparent when disassociated from each other; and
   the one or more donor particles and the one or more acceptor particles are configured to:
   disassociate from each other above a predetermined temperature; and
   recombine below the predetermined temperature.

10. An apparatus as defined in claim 1 further comprising a non-thermochromic compound overlaying the second side of the substrate layer to form at least one graphical representation associated with at least one of a logo, a word, a phrase, a trademark, or an alignment mark;
    wherein a portion of the non-thermochromic compound is disposed between the at least one thermochromic compound and the second side of the substrate layer.

11. An apparatus as defined in claim 1, wherein:
    the apparatus is devoid of a protective compound interspersed with the thermochromic compound for protection of the thermochromic compound during the first impact with the second object.

12. A method comprising:
    providing a substrate layer having a first side and a second side, the first side configured to engage a surface of a first object;
    overlaying at least one thermochromic compound over at least first and second surface portions of the second side of the substrate layer to generate a set of temporary marks;
    wherein overlaying the at least one thermochromic compound comprises:
    overlaying a thermochromic layer comprising first and second thermochromic compound such that:

the first and second compounds are different from each other;

the first thermochromic compound overlays the first surface portion without overlaying the second surface portion;

the second thermochromic compound overlays the second surface portion without overlaying the first surface portion;

the second thermochromic compound is disposed proximate to and in direct contact with at least part of the first thermochromic compound;

the first thermochromic compound comprises a first thermochromic color at a first temperature;

the second thermochromic compound comprises a second thermochromic color at the first temperature; and while the first and second thermochromic compounds are at the first temperature, a contrast between the first and second thermochromic colors defines a pattern over the substrate layer; and overlaying the at least on thermochromic compound to:

present a first temporary mark of the set of temporary marks at a first impact location associated with a first impact over the surface of the first object by a second object, the at least one thermochromic compound being devoid of a protective barrier such that at least one of the first or second thermochromic compounds is in direct contact with the second object during the first impact;

present one or more subsequent temporary marks of the set of temporary marks at one or more subsequent impact locations associated with one or more subsequent impacts to the surface of the first object;

enable the first temporary mark to:
fade throughout a fading period accommodative of the one or more subsequent impacts; and
remain distinguishable throughout the fading period from the one or more subsequent temporary marks; and permit reuse of the thermochromic layer after the one or more subsequent impacts to indicate further impacts via further temporary marks after the first temporary mark and the one or more subsequent temporary marks have completely faded away.

13. A method as defined in claim 12 further comprising:
overlaying a non-thermochromic compound layer on the second side of the substrate to form at least one graphical representation associated with at least one of a logo, a word, a phrase, a trademark, or an alignment mark.

14. A method as defined in claim 12, wherein:
overlaying the at least one thermochromic compound comprises:
printing the thermochromic layer over the at first and second surface portions of the second side of the substrate layer.

15. A method as defined in claim 12 further comprising disposing a releasable adhesive layer on the first side of the substrate layer.

16. A method as defined in claim 15, further comprising: disposing a silicone-coated liner layer on the releasable adhesive layer.

17. A method as defined in claim 12 further comprising engaging a releasable adhesive layer to the surface, the releasable adhesive layer being disposed on the first side of the substrate layer.

18. A method as defined in claim 12, wherein
the surface comprises at least one of a club face of a golf club head, a sole of a golf club head, a portion of a hockey stick, or a portion of a baseball bat.

19. The method of claim 12, wherein:
each of the at least one thermochromic compound comprises:
one or more donor particles, and one or more acceptor particles;
the one or more donor particles and the one or more acceptor particles form a first color when combined together;
the one or more donor particles and the one or more acceptor particles are transparent when disassociated from each other; and
the one or more donor particles and the one or more acceptor particles are configured to:
disassociate from each other above a predetermined temperature; and
recombine below the predetermined temperature.

20. An impact indicator comprising:
a substrate having a first side and a second side opposite the first side;
a pressure-sensitive adhesive film overlaying at least one portion of the first side to engage a club face of a golf club head; and
an impact surface comprising a thermochromic ink film overlaying at least one portion of the second side to generate at least one temporary mark indicative of at least one impact to the impact surface by at least one golf ball;
wherein:
the impact indicator is devoid of a protective barrier over the thermochromic ink during the at least one impact such that the thermochromic ink is an exposed outermost layer of the impact surface;
the thermochromic ink comprises:
a first thermochromic compound; and
a second thermochromic compound different than the first thermochromic compound;
the first thermochromic compound comprises a first thermochromic color at a first temperature;
the second thermochromic compound comprises a second thermochromic color at the first temperature;
while the first and second thermochromic compounds are at the first temperature, a contrast between the first and second thermochromic colors defines a pattern over the substrate layer;
the second thermochromic compound is disposed proximate to and in direct contact with at least part of the first thermochromic compound;
the first thermochromic compound overlays the first surface portion of the at least one portion of the second side of the substrate without overlaying a second surface portion of the at least on portion of the second side of the substrate; and
the second thermochromic compound overlays the second surface portion without overlaying the first surface portion.

21. An impact indicator as defined in claim 20, wherein the club face comprises a club face associated with at least one of a driver-type golf club, a fairway wood-type golf club, a hybrid-type golf club, an iron-type golf club, or a putter.

22. An impact indicator as defined in claim 20,
wherein the thermochromic ink is associated with a grayish color, and
wherein the at least one temporary mark comprises
a temporary mark associated with a whitish color.

23. An impact indicator as defined in claim 20, wherein the impact label comprises
a length of about 2.9 inches (73.66 millimeters) and
a width of about 1.4 inches (35.56 millimeters).

24. The impact indicator of claim 20, wherein:
the thermochromic ink comprises:
one or more donor particles, and one or more acceptor particles;
the one or more donor particles and the one or more acceptor particles form a first color when combined together;
the one or more donor particles and the one or more acceptor particles are transparent when disassociated from each other; and
the one or more donor particles and the one or more acceptor particles are configured to:
disassociate from each other above a predetermined temperature; and
recombine below the predetermined temperature.

25. An impact indicator as defined in claim 20, wherein:
the at least one temporary mark is configured to comprise:
a first temporary mark over the impact surface at a first impact location associated with a first impact of the impact surface by the golf ball; and
one or more subsequent temporary marks over the impact surface at one or more subsequent impact locations associated with one or more subsequent impacts to the impact surface.

26. An impact indicator as defined in claim 25, wherein:
the thermochromic ink is configured to be in direct contact with the golf ball during the at least one impact; and
the thermochromic ink is configured to enable the first temporary mark to:
fade throughout a fading period accommodative of the one or more subsequent impacts; and
remain distinguishable throughout the fading period from the one or more subsequent temporary marks.

\* \* \* \* \*